(12) United States Patent
Vaidya et al.

(10) Patent No.: US 12,713,288 B2
(45) Date of Patent: Aug. 18, 2026

(54) METHODS AND APPARATUS FOR INDICATING USER EQUIPMENT (UE) SUPPORT FOR CONGESTION RELATED FEEDBACK FOR SCALABLE THROUGHPUT SERVICES AND FOR USING SUCH FEEDBACK

(71) Applicant: Charter Communications Operating, LLC, St. Louis, MO (US)

(72) Inventors: Maulik Vaidya, Escondido, CA (US); Paul L. Russell, Jr., Lawrence, NJ (US); Yildirim Sahin, Englewood, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 619 days.

(21) Appl. No.: 18/196,607

(22) Filed: May 12, 2023

(65) Prior Publication Data

US 2024/0381171 A1 Nov. 14, 2024

(51) Int. Cl.
*H04W 28/02* (2009.01)
*H04W 72/51* (2023.01)

(52) U.S. Cl.
CPC ... *H04W 28/0289* (2013.01); *H04W 28/0268* (2013.01); *H04W 72/51* (2023.01)

(58) Field of Classification Search
CPC .............. H04L 47/31; H04W 28/0289; H04W 28/0268; H04W 72/51; H04W 8/24; H04W 76/12
See application file for complete search history.

(56) References Cited

U.S. PATENT DOCUMENTS

| | | | | |
|---|---|---|---|---|
| 12,413,653 | B1 * | 9/2025 | Yi | H04W 76/12 |
| 2002/0150060 | A1 | 10/2002 | Montpetit | |

(Continued)

FOREIGN PATENT DOCUMENTS

| | | | | | |
|---|---|---|---|---|---|
| EP | 4391639 | A1 | 6/2024 | | |
| WO | 2023/046118 | A1 | 3/2023 | | |
| WO | WO-2024013545 | A1 * | 1/2024 | | H04L 47/50 |

OTHER PUBLICATIONS

Ericsson et. al, "Resolution of EN for L4S", SA WG2 Meeting #156e E-meeting, S2-2306189, Apr. 17, 2023 to Apr. 21, 2023. (Year: 2023).*

(Continued)

*Primary Examiner* — Khoa Huynh

(74) *Attorney, Agent, or Firm* — Straub & Straub; Michael P. Straub; Stephen T. Straub

(57) ABSTRACT

In various embodiments an explicit congestion feedback capabilities indication, e.g., information indicating a UE's support or lack of support for low latency, low loss and scalable throughput services (L4S), is communicated in a message sent from a UE to device in a network core. In some embodiments the communicated UE capability information provides information about the capability of the UE sending the message to support the use of feedback (e.g., congestion feedback) for scalable throughput services (e.g., (L4S services) or other explicit congestion notification (ECN) services which use congestion feedback for encoding and/or data rate control). In some embodiments the message or messages communicating the UE capability information include a PDU Session Establishment Request message, a PDU Session Modification Request message, and/or a Registration Request message.

16 Claims, 10 Drawing Sheets

(56) References Cited

U.S. PATENT DOCUMENTS

| | | | | |
|---|---|---|---|---|
| 2024/0056401 | A1 | 2/2024 | Nádas et al. | |
| 2024/0236765 | A1 | 7/2024 | Xu et al. | |
| 2024/0334243 | A1 | 10/2024 | Taneja | |
| 2024/0373448 | A1 | 11/2024 | Fang et al. | |
| 2025/0016883 | A1 | 1/2025 | Yang et al. | |
| 2025/0126064 | A1 * | 4/2025 | Ke | H04L 47/31 |
| 2025/0168072 | A1 | 5/2025 | Karampatsis et al. | |

OTHER PUBLICATIONS

LTE; 5G; Interface between the Control Plane and the User Plane nodes (3GPP TS 29.244 version 16.5.0 Release 16) ETSI TS 129 244, V16.5.0, Nov. 2020, 317 pages.

Change Request, Resolution of EN for L4S, SA WG2 Meeting #156e, S2-2306189, E-meeting, Apr. 17, 2023-Apr. 21, 2023, 4 pages.

Change Request, Standardized traffic categories in URSP, 3GPP TSG-CT WG1 Meeting #141e, C1-232295, Online Apr. 17-21, 2023, 15 pages.

Iyengar et al., RFC 9000, QUIC: A UDP-Based Multiplexed and Secure Transport, Internet Engineering Task Force (IETF), May 2021, 151 pages.

Briscoe et al., RFC 9330, Low Latency, Low Loss, and Scalable Throughput (L4S) Internet Service: Architecture, Internet Engineering Task Force (IETF), Jan. 2023, 36 pages.

De Schepper et al., RFC 9331, The Explicit Congestion Notification (ECN) Protocol for Low Latency, Low Loss, and Scalable Throughput (L4S), Internet Engineering Task Force (IETF), Jan. 2023, 52 pages.

De Schepper et al., RFC 9332, Dual-Queue Coupled Active Queue Management (AQM) for Low Latency, Low Loss, and Scalable Throughput (L4S), Internet Engineering Task Force (IETF), Jan. 2023, 52 pages.

Ramakrishnan et al., Request for Comments: 3168, The Addition of Explicit Congestion Notification (ECN) to IP, Network Working Group, Sep. 2001, 63 pages.

Kohler et al., Request for Comments: 4340, Datagram Congestion Control Protocol (DCCP), Network Working Group, Mar. 2006, 129 pages.

Randall R. Stewart, Request for Comments: 4960, Stream Control Transmission Protocol, Network Working Group, Sep. 2007, 96 pages, downloaded from https://www.rfc-editor.org/rfc/rfc4960.txt.

Sarker et al., Request for Comments: 8888, RTP Control Protocol (RTCP) Feedback for Congestion Control, Internet Engineering Task Force (IETF), Jan. 2021, 9 pages, downloaded from https://www.rfc-editor.org/rfc/rfc8888.txt.

Briscoe et al., More Accurate ECN Feedback in TCP, Workgroup: TCP Maintenance & Minor Extensions (tcpm), Internet-Draft: draft-ietf-tcpm-accurate-ecn-22, Updates: 3168 (if approved), Intended Status: Standards Track dated Nov. 9, 2022, 51 pages.

Change Request, Connection capabilities defined in GSMA PRD NG. 135, 3GPP TSG-CT WG1 Meeting #140, C1-230083, Athens, Greece, Feb. 27-Mar. 3, 2023, 13 pages.

Change Request, Standardized traffic categories in URSP, 3GPP TSG-CT WG1 Meeting #140, C1-230314, Athens, Greece, Feb. 27-Mar. 3, 2023, 15 pages.

LS reply on Traffic Categories, ENSWI#20 Doc 004, 3GPP TSG-CT WG1 Meeting #140, C1-230713, Athens, Greece, Feb. 27-Mar. 3, 2023, 4 pages.

Third Generation Partnership Project (3GPP™), Draft Meeting Report for TSG CT WGT meeting: 140, Athens, Geneva, Feb. 27, 2023 to Mar. 3, 2023, 365 pages.

3rd Generation Partnership Project; Technical Specification Group Core Network and Terminals; Numbering, addressing and identification; (Release 18), 3GPP TS 23.003 V18.1.0, Mar. 2023, 152 pages.

3rd Generation Partnership Project; Technical Specification Group Services and System Aspects; System architecture for the 5G System (5GS); Stage 2 (Release 18), 3GPP TS 23.501 V18.1.0, Mar. 2023, 667 pages.

3rd Generation Partnership Project; Technical Specification Group Services and System Aspects; Procedures for the 5G System (5GS); Stage 2 (Release 18), 3GPP TS 23.502 V18.1.1 Apr. 2023, 829 pages.

3rd Generation Partnership Project; Technical Specification Group Services and System Aspects; Policy and charging control framework for the 5G System (5GS); Stage 2 (Release 18), 3GPP TS 23.503 V18.1.0, Mar. 2023, 165 pages.

3rd Generation Partnership Project; Technical Specification Group Core Network and Terminals; Non-Access-Stratum (NAS) protocol for 5G System (5GS); Stage 3; (Release 18), 3GPP TS 24.501 V18.2.1, Mar. 2023, 1057 pages.

3rd Generation Partnership Project; Technical Specification Group Core Network and Terminals; User Equipment (UE) policies for 5G System (5GS); Stage 3 (Release 18), 3GPP TS 24.526 V18.0.0, Sep. 2022, 59 pages.

3rd Generation Partnership Project; Technical Specification Group Core Network and Terminals; User Equipment (UE) policies for 5G System (5GS); Stage 3, (Release 18), 3GPP TS 24.526 V18.2.0, Mar. 2023, 64 pages.

3rd Generation Partnership Project; Technical Specification Group Radio Access Network; NR; NR and NG-RAN Overall Description; Stage 2 (Release 17), 3GPP TS 38.300 V17.4.0, Mar. 2023, 210 pages.

3rd Generation Partnership Project; Technical Specification Group Radio Access Network; NG-RAN; PDU Session User Plane Protocol (Release 17), 3GPP TS 38.415 V17.0.0, Apr. 2022, 18 pages.

* cited by examiner

| FIGURE 3A |
| --- |
| FIGURE 3B |

FIGURE 3

| FIGURE 7A |
| --- |
| FIGURE 7B |

METHODS AND APPARATUS FOR INDICATING USER EQUIPMENT (UE) SUPPORT FOR CONGESTION RELATED FEEDBACK FOR SCALABLE THROUGHPUT SERVICES AND FOR USING SUCH FEEDBACK

FIELD

The present application relates to communications methods and more particularly to methods and apparatus for indicating User Equipment (UE) support for congestion related feedback for scalable throughput services and/or applications, e.g., L4S (Low Latency, Low Loss and Scalable Throughput) services and/or applications, and for using such information, e.g., to select user plane functions and/or to support rate adaptive services or applications.

BACKGROUND

The 5G System (5GS) architecture is designed to support a wide variety of services, including media services including advanced media services, e.g., High Data Rate Low Latency (HDRLL) services, Augmented Reality/Virtual Reality/extended Reality (AR/VR/XR) services and tactile/multi-modality communication services. It is desirable to provide enhancements to support interaction between 5GS and applications executed on user devices to facilitate such services.

Ref: TS 23.501 V18.1.0 clause 5.37.3. describes the use of Explicit Congestion Notification (ECN) marking for L4S (Low Latency, Low Loss and Scalable Throughput) to expose the congestion information. Congestion information is exposed by marking ECN bits in the IP header of the user IP packets between the UE and the application server to trigger application layer rate adaptation.

In 5G System, ECN marking for L4S may be supported. ECN marking for L4S is enabled on a per Quality of Service (QOS) Flow basis in the uplink and/or downlink direction and may be used for Guaranteed Bit Rate (GBR) and non-GBR QoS Flows. ECN marking for the L4S in the IP header is supported. Whether NG-RAN or PSA UPF based ECN marking for L4S is used is decided by SMF (Session Management Function) based on operator's network configuration and policies. In the case of ECN marking for L4S by UPF, the NG-RAN is instructed to perform congestion information monitoring.

As for any QoS flow, QoS rules in the UE and PDRs (Packet Detection Rules) in the PSA User Plane Function (UPF) control which packets are bound to the L4S enabled QoS flow. The Packet Filter Set in the QoS rule or PDR can use packet filter(s) in clause 5.7.6.2 (e.g. ECT (1) (ECN Capable Transport (1)) and/or IP 5 tuple) to steer traffic to an L4S enabled QoS Flow.

A QoS flow may be enabled with ECN marking for L4S requirement e.g. statically when a PDU (Packet Data Unit) session is established based on configuration in SMF (Session Management Function) or PCF (Policy Control Function), or dynamically based on detection of the L4S traffic e.g. via ECT (1) and/or IP 5 tuple in the IP header whereby SMF or PCF triggers a setup of a QoS Flow enabled for L4S, or by requests by an AF (Application Function). To support this functionality, the UE needs to support L4S feedback.

Not all UEs in a system may support L4S feedback. In addition, UEs which support L4S feedback (L4F) may support it for some transport protocols but not others. A core network providing service to a UE is normally responsible for allocating user plane functions to support communications and applications a UE may use. Unfortunately, at the time of allocating a user plane function core networks may not have knowledge of a UE's actual capabilities. In such a case, in order to support L4S functionally the core network may assign a user plane function with L4S capabilities that a UE can not use. The allocated resources which can not be used by a UE is a waste of network resources. Since L4S support is something that is being added to networks and devices, it would be desirable if the network support for L4S could be closely matched to the UE device's actual capabilities and/or needs. However, at the present time the network core generally lacks the information needed to decide how best to match UPF functionality to a UE's L4S capabilities since the core network will normally lack information about a UE's L4S capabilities at the time of UPF assignment.

Currently a communications system operator is not aware of a UE's L4S capabilities when assigning resources to support UE communications. Furthermore, 3GPP R18 specifications do not provide for an explicit indication from the UE of its support for L4S Feedback to 5GS and thus a mechanism is lacking for making the network operator aware of a UE's capabilities with regard to L4S and support for congestion feedback.

In view of the above, it should be appreciated that there is a need for methods and/or apparatus which can facilitate efficient support of L4S in a communications network. In particular it would be desirable if methods and/or apparatus could be developed which could provide or inform a network core of UE device capability with regard to supporting use of congestion feedback and/or which would allow a network core to efficiently select or provide a UPF (User Plane Function) to serve a UE which matches a UE's capabilities but which does not provide L4S capabilities which can not be used by the UE being assigned to a UPF.

SUMMARY

In various embodiments an explicit congestion feedback capabilities indication, e.g., information indicating a UE's support or lack of support for L4S, is communicated in a message sent from a UE to device in a network core. In some embodiments the communicated UE capability information provides information about the capability of the UE sending the message to support the use of feedback (e.g., congestion feedback) for scalable throughput services (e.g., low latency, low loss and scalable throughput services (L4S services) or other explicit congestion notification (ECN) services which use congestion feedback for encoding and/or data rate control). In some embodiments the message or messages communicating the UE capability information include a PDU Session Establishment Request message, a PDU Session Modification Request message and/or a Registration Request message.

The message communicating UE capability information informs the network core of a UE's capabilities with regard to supporting the use of congestion feedback and allows the network core to efficiently allocate resources, such as a User Plane Function (UPF), to the UE taking into consideration the UE's capabilities. In this way, the network core can efficiently allocate resources matching different UPFs to UEs based on the differences in UE capability information.

In some embodiments UEs which indicate they do not support L4S congestion feedback are assigned to UPFs which do not require L4S service while UEs which support L4S feedback are assigned UPFs which support L4S services.

In some embodiments the message communicating UE capability information includes an L4S Feedback support indicator, e.g., a 1 bit indicator, indicating whether the UE sending the message supports or does not support L4S functionality. For devices which support L4S functionality, the message further optionally includes a list or other indicator of one or more transport protocols supported by the UE which support L4S feedback. In some embodiments where a list of protocols for which the UE supports L4S feedback capability is included, the list may serve as the indicator of L4S feedback capability and the indicator may be omitted. Thus while in some embodiments both an indicator and a list are included, one or the other may be included depending on the particular embodiments. The UE capability information may and sometimes does identify a transport protocol and/or a portion of a standard associated with the protocol that is supported. For example, the message may indicate, AccECN for TCP (Transmission Control Protocol), QUIC for UDP (User Datagram Protocol). The list can and sometimes does include one, more than one, any possible combination of one or more, or all of IETF specified Transport protocols and/or transport related control protocols listed below or described in one of the documents identified below that related to the listed protocol:

- TCP as indicated in Workgroup TCP Maintenance & Minor Extensions (tcpm) Internet draft: draft-ietf-tcpm-accurate-ecn-22, Updates 3168 Published 9 Nov. 2022 (titled: More Accurate ECN Feedback in TCP)
- UDP as indicated in Internet Engineering Task Force (IETF), RFC 9000 and titled "QUIC, A UDP-Based Multiplexed and Secure Transport published May 2021
- UDP as indicated in publicly available Network Working Group Request for Comments (RFC) 4340 titled: Datagram Congestion Control Protocol (DCCP) dated March 2006
- RTP as indicated in Internet Engineering Task Force (IETF) Request For Comments: 8888, titled: "RTP Control Protocol (RTCP) Feedback for Congestion Control", January 2021
- SCTP as indicated in Network Working Group Request for Comments: 4960 titled: "Stream Control Transmission Protocol", dated September 2007

A network device receives the UE capability information message and a UPF which supports the indicated L4F capability, e.g., supported L4S Service or services, is selected and allowed to the UE. In some cases where the UE indicates that L4F functionality is not supported a UPF is allocated to the UE which does not support L4F functionality.

In some cases, at the time the UPF allocation is made, the application or applications running on the UE do not require and/or do not support L4F functionality. However, in at least one such case if the UE message indicates that the UE supports L4F capability a UPF will be assigned that supports L4S functionality, e.g., one or more L4S services. In this way if the UE begins using another, e.g., second, application which requires or supports L4F functionality the allocated network functions/resources will be able to satisfy the UE's needs for L4S Service without having to change the assigned functions/resources to enable use of the UE's L4S feedback capabilities.

After a UE communicates it's L4S feedback capability information to the network core and begins using an application which supports L4S functionality, the UE can and sometimes does communicate downlink congestion feedback information to the Application Server and/or receive uplink congestion feedback information from the Application Server. The UE uses the received uplink congestion feedback information in some cases to perform uplink rate adaption, e.g., to increase the uplink data rate in response to a decrease in network congestion and/or to decrease the uplink data rate in response to uplink feedback information indicating an increase in uplink congestion. The application server and/or network core uses received downlink congestion feedback information in some cases to perform downlink rate adaption, e.g., to increase the downlink data rate in response to a decrease in network congestion in the downlink and/or to decrease the downlink data rate in response to downlink feedback information indicating an increase in downlink congestion. Thus, the application server and/or network core uses the downlink provided information to perform downlink rate adaptation in at least some cases.

By communicating UE support for congestion feedback information and/or other L4S capability information, the network can efficiently allocated resources without having to support L4S functionality which the UE being assigned the resources can not take advantage of. While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 3 comprises the combination of FIG. 3A and FIG. 3B.

DETAILED DESCRIPTION

Figure 1:
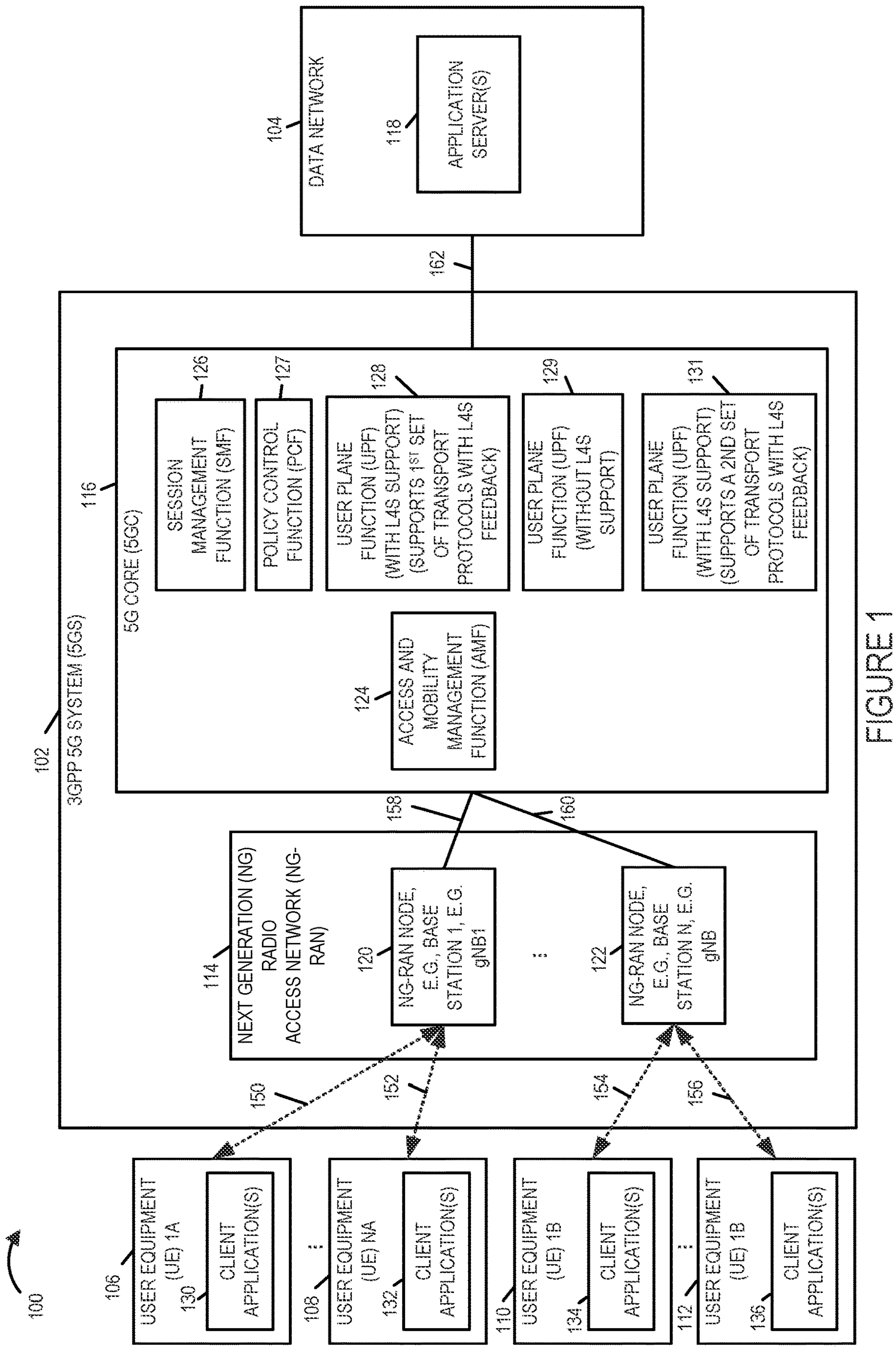
FIG. 1 is a drawing of an exemplary communications system in accordance with an exemplary embodiment.

FIG. 1 is a drawing of an exemplary communications system 100 in accordance with an exemplary embodiment. While the exemplary embodiments show an example using a 3GPP 5G system, the invention is not limited to such systems and the messages of the invention can be used in wired access systems and with non-3GPP ANs (access networks). Thus, it should be appreciated that the invention and messages can be used with NG-RAN and non-3GPP RAN where the non-3GPP AN can be any of the following: untrusted, trusted, or wireline access network depending on the embodiment in which the invention is used.

Exemplary communications system 100 includes a 3GPP 5G system (5GS) 102, a data network 104 and a plurality of user equipments (UEs) (UE1A 106, . . . , UE NA 108, UE1B 110, . . . , UENB 112) coupled together as shown. The 3GPP 5G system 102 includes a next generation (NG) radio access network (NG-RAN) 114 coupled 5G core (5GC) 116 as shown. NG-RAN 114 includes a plurality of NG-RAN nodes (NG-RAN node 1 120, e.g., base station 1, e.g., gNB1, . . . , NG-RAN node N 122, e.g., base station N 122, e.g., gNB N). The 5G core 116 includes an access and mobility management function (AMF) 124, a session management function (SMF) 126, a policy control function (PCF) 127, a user plane function (UPF) 128 with L4S support (supports a 1st set of transport protocols with L4S feedback), a UPF 129 without L4S support, and a UPF 131 with L4S support (supports a 2nd set of transport protocols with L4S feedback), which may be coupled together. The data network 104 includes application server(s) 118. Each UE includes client applications. Some of the applications may require L4S capability. UE1A 106 includes client application(s) 130. UENA 108 includes client application(s) 132. UE1B 110 includes client application(s) 134. UENB 112 includes client application(s) 136.

UE 1A 106 is coupled to NG-RAN node 1 120 via wireless communications link 150. UE NA 108 is coupled to NG-RAN node 1 120 via wireless communications link 150. NG-RAN node 1 120 is coupled to the 5G core 116 via communications link 152. UE 1B 110 is coupled to NG-RAN node N 122 via wireless communications link 154. UE NB 108 is coupled to NG-RAN node N 122 via wireless communications link 156. NG-RAN node N 122 is coupled to the 5G core 116 via communications link 160. 5G core 116 is coupled to data network 104 via communications link 162.

In accordance with a feature of various embodiments of the present invention, a UE generates and sends a message, e.g., a session establishment request message, including UE device L4S capability information, to the 5C core 116, e.g., to the AMF 124 in the 5C core 116. In some embodiments, the L4S capability information includes 1 bit indicating whether or not the UE supports L4S feedback capability. In some embodiments, the L4S capability information includes a list of transport protocols which support L4S feedback capability which are supported by the UE. The term L4S Feedback (used in 3GPP specifications) and ECN Feedback (used in IETF specifications) in the context of this application are interchangeable.

Figure 2:
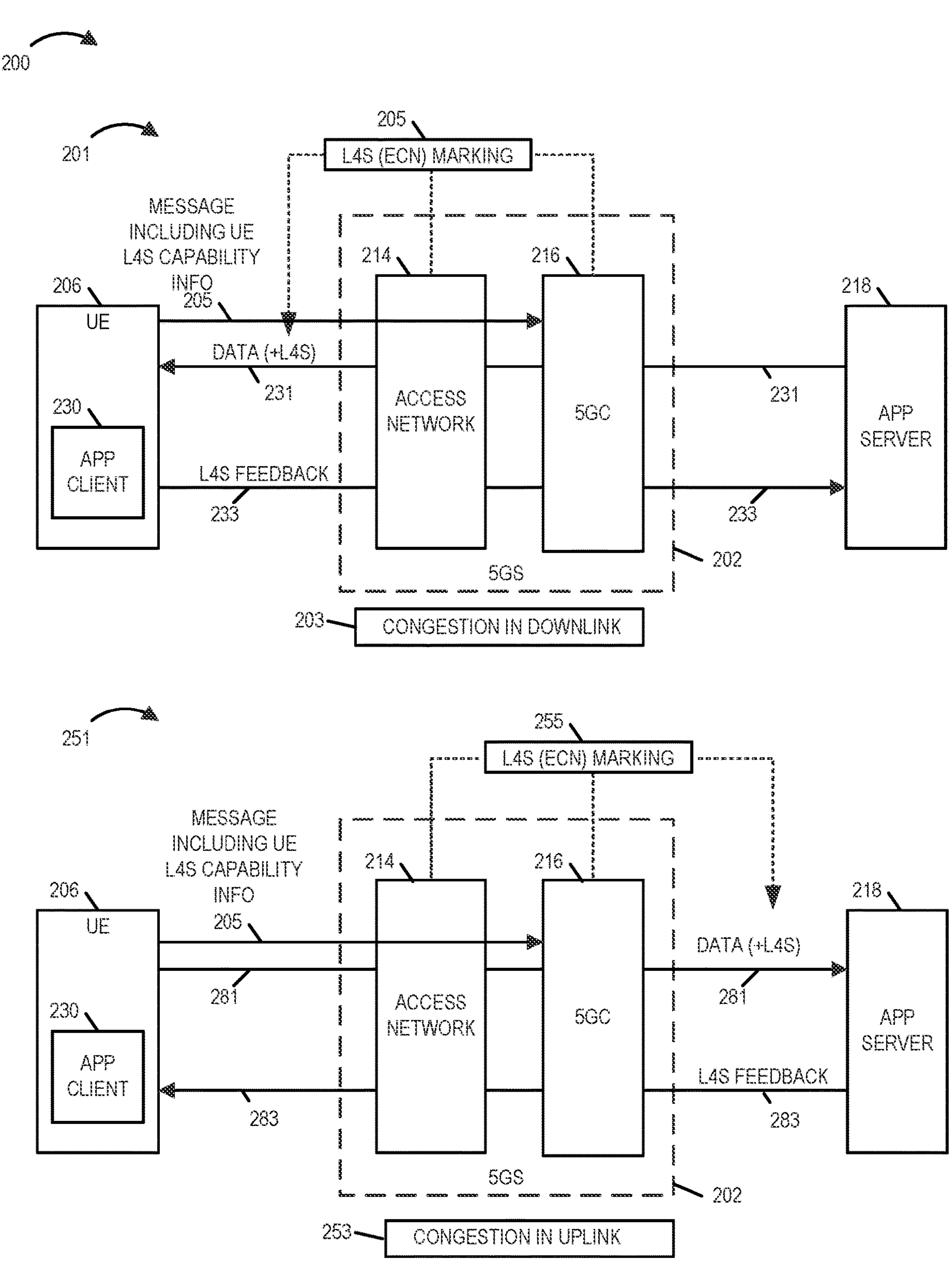
FIG. 2 is a drawing illustrating an exemplary 5G system in accordance with an exemplary embodiment, in which a UE generates and communicates a message to the core which includes information communicating the UE's L4S feedback capability information, and the system uses ECN marking for the purpose of Low Latency, Low Loss Scalable Throughput Services (L4S) when congestion is detected in the uplink or downlink so that the application layer can trigger real-time adaption of real time traffic (i.e., video encoder) based on ECN feedback.

Drawing 200 of FIG. 2 includes illustrations (201, 251) where the 5G System 202 uses ECN marking (205, 255) for the purpose of Low Latency, Low Loss and Scalable Throughput services (L4S) when congestion is detected in the uplink or downlink so that the application layer can trigger real-time and gradual rate adaptation of the real-time traffic (i.e., video encoder) based on ECN feedback.

FIG. 2 is a drawing 200 including a first drawing 201 illustrating congestion in downlink as indicated by label 201, and a second drawing 251 illustrating congestion in uplink, as indicated by label 253. In drawing 200 the exemplary communications system includes 5GS 202 including access network 214 and 5GC 216, UE 206 including application client 230, and application server 218. In one exemplary embodiment, UE 206 is UE 1A 106 of FIG. 1, 5GS 202 is 5GS 102 of FIG. 1, access network 214 is NG-RAN 114 of FIG. 1, 5GC 216 is 5GC 116 of FIG. 1, and application server 218 is one of the set of application server(s) 118.

For the example of congestion in downlink shown in drawing 201, application server 231 communicates, e.g., sends, data (+L4S) signals 231, via the 5GS 202, to the UE 206. In response, UE 206 communicates, e.g., sends, L4S feedback signals 233, via 5GS 202, to application server 218. For the example of congestion in uplink of drawing 251, UE 206 communicates, e.g., sends, data (+L4S) signals 281, via the 5GS 202, to the application server 218. In response, application server 218 communicates, e.g., sends, L4S feedback signals 283, via 5GS 202, to UE 206.

FIG. 3 illustrates how an explicit capability indication from the UE 106 is performed during PDU Session Establishment.

In step 306, the UE 106 provides in the PDU Session Establishment Request message 308 an enhanced 5GSM Capability IE 314 which includes a list of L4S Feedback capabilities 316. UE's L4S Feedback capabilities can also be included in a new IE or included in an existing IE like 5GSM Capability.

The network may use this indicator to determine and allocate appropriate resources (e.g., UPF with L4S support) for the PDU session being requested. 5GC and NG-RAN inspects the IP header of the PDU Session's UL/DL traffic and classifies the traffic as either L4S or Classic for queue routing and scheduling. This classification is based on the IP header's ECN field, where an ECT(0) codepoint indicates support/request for a Classic service flow and an ECT(1) codepoint indicates support/request for an L4S service flow.

Traffic that is marked for L4S treatment is processed through a QoS flow w/low latency AQM ECN support, which enable end to end Low Latency Low Loss Scalable throughput.

This processing for L4S treatment in the 5GC and NG-RAN includes functionality to support ECN marking by setting the ECN field of the IP header to a CE codepoint when congestion is experienced within the NG-RAN as well as supporting Low Latency AQM functionality.

Processing in the UE, Client Application, and Application Server for L4S treatment include transport layer feedback processing and application layer rate adaptation.

In accordance with the invention, in some embodiments a message is generated and communicated by a UE to a device in a communications network core to provide the network core with information about the UE's L4S feedback capabilities.

In one particular exemplary embodiment an explicit L4S Feedback capabilities indication included in a Registration Request's UE MM (Mobility Management) Core Network Capability (5GMM Capability) information. This L4S Feedback capabilities information included in a message includes in some embodiments an L4S Feedback support indication and optionally, in some cases, a list of transport protocols supported by the UE sending the message which support L4S Feedback (i.e., AccECN for TCP, QUIC for UDP, or no L4S feedback support). The list includes one, multiple, all or any possible combination of the following IETF specified Transport or control protocols:

For TCP: draft-ietf-tcpm-accurate-ecn-22 (AccECN, More Accurate ECN Feedback in TCP)

For UDP: RFC 9000 (QUIC, A UDP-Based Multiplexed and Secure Transport)

For UDP: RFC 4340 (DCCP, Datagram Congestion Control Protocol)

For RTP: RFC 8888 (RTCP, RTP Control Protocol Feedback for Congestion Control)

other IETF specified transport protocols (e.g., SCTP).

When the network core, e.g., a 5GS core, is made aware that the UE does not support L4S Feedback or supports it only for subclass of transport protocols, the communications network core benefits by performing one, more than one or all of:

Managing network resources efficiently (e.g., memory buffer queues, scheduler, and AQM (Active Queue Management) can be and sometimes are managed based on the UE capability information avoiding the need for Ques, Que Management and/or scheduling functionality that will not be used for the UE.

Dynamically allocating resources (i.e., memory) based on the capabilities of the devices currently connected to its 5GC, which is beneficial in cloud/virtual deployments.

Updating URSP (User Equipment Route Selection Policy) rules based on the actual reported capabilities of UEs rather than expected capabilities.

The invention will now be explained further in the context of the FIG. 3 example, with the understanding that the invention is not limited to the exemplary message used in FIG. 3 to communicate L4S capability information to the network core.

Figure 3A:
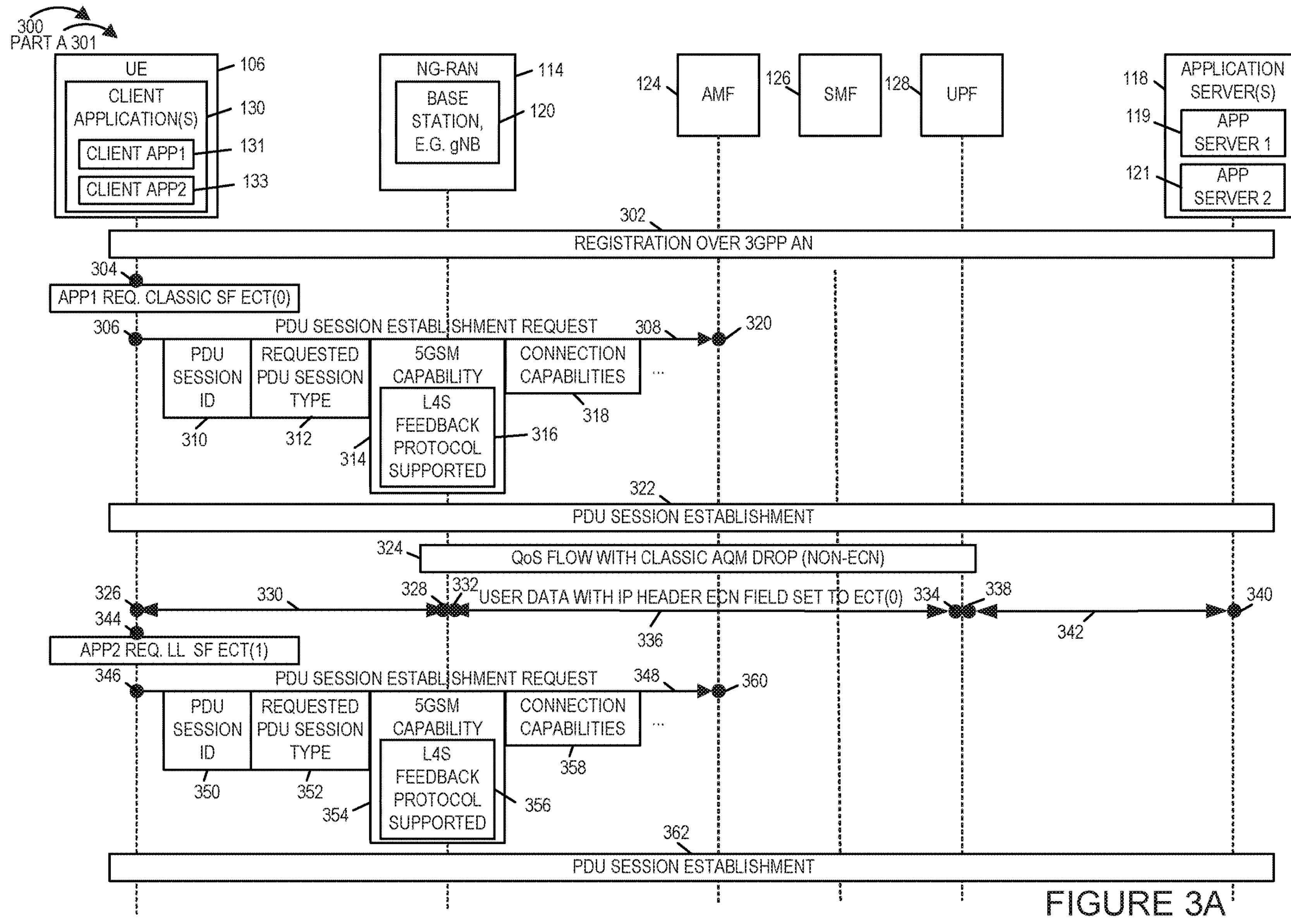
FIG. 3A is a first part of a signaling diagram illustrating an exemplary communications method in accordance with an exemplary embodiment.
Figure 3B:
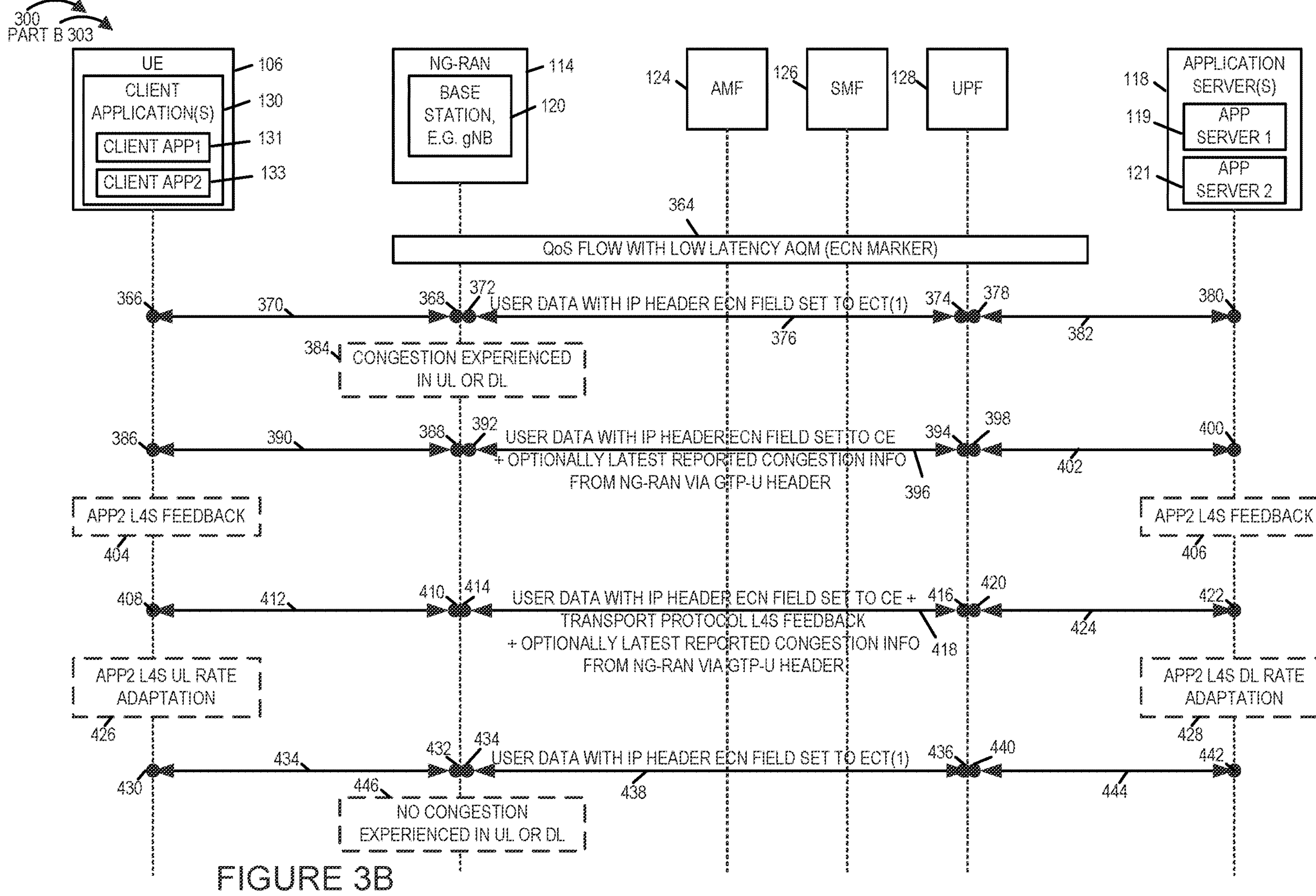
FIG. 3B is second part of signaling diagram illustrating an exemplary communications method in accordance with an exemplary embodiment.

FIG. 3, comprising the combination of FIG. 3A and FIG. 3B is a signaling diagram 300 comprising the combination of Part A 301 and Part B 303, illustrating an exemplary method in accordance with an exemplary embodiment. Signaling diagram 300 includes various elements of system 100 of FIG. 1 including UE 106, NG-RAN 114 including base station 1 120, e.g., gNB1, AMF 124, SMF 126, UPF 128, and application server(s) 118. UE device 106 includes client applications 130, which includes client application 1 131 and client application 2 133. Application servers 118 includes application server 1 119 and application server 2 121.

In step 302 the UE 106 registers over 3GPP AN 114. APP1 requires classic SF Explicit Congestion Notification (ECN) Capable Transport(0) (ECT(0)) as indicated by block 304. In step 306 UE 106 generates and sends PDU session establishment request 308 (corresponding to application 1) to AMF 124. PDU session establishment request 308 includes a PDU session ID 310, a requested PDU session type 312, 5GSM capability information 314 and connection capability information 318. The 5GSM (5G Session Management) capability information 314 includes L4S feedback transport protocol supported information 316 (i.e., QUIC for UDP, AccECN for TCP, . . . , none (no L4S feedback supported)). In step 320, the AMF receives the PDU session establishment request 308 and recovers the communicated information including the L4S feedback protocol supported information 316. In step 322 PDU session establishment operations are performed and the requested PDU session is established.

In this example, for the established PDU session, there is a QoS flow w/Classic AQM drop (non-ECN), as indicated by block 324. User data with IP header ECN field set to ECT(0) is communicated between the endpoints of the communications session (client app 1 131 of UE 106 and application server 1 119). In steps 326 and 328 UE 106 and base station 1 120 are operated to communicate (send and receive) user data 330 with IP header ECN field set to ECT(0). In steps 332 and 334 base station 1 120 and UPF 128 are operated to communicate (send and receive) user data 336 with IP header ECN field set to ECT(0). In steps 338 and 340 UPF 128 and APP server 1 119 are operated to communicate (send and receive) user data 342 with IP header ECN field set to ECT(0).

APP2 requires LL SF ECT(1) as indicated by block 344. In step 346 UE 106 generates and sends PDU session establishment request 348 (corresponding to application 2) to AMF 124. PDU session establishment request 348 includes a PDU session ID 350, a requested PDU session type 352, 5GSM capability information 354 and connection capability information 358. The 5GSM capability information 354 includes L4S feedback protocol supported information 356. In step 360, the AMF 124 receives the PDU session establishment request 348 and recovers the communicated information including the L4S feedback protocol supported information 356. In step 362 PDU session establishment operations are performed and the requested PDU session is established.

There is now a QoS flow with low latency active queue management (LL AQM) (ECN marker), as indicated by block 364. With the QOS flow having been established in step 364 operation proceeds to step 366 in which the UE communicates, as represented by arrows 370, 376 and 382 with the application servers 119, 121, supporting client application 1, 131 and client application 2 133 respectively. Arrow 376 represents the communication of user data with IP header ECN field set to ECT (1) between the base station 120 and UPF 128 which occurs as part of communication steps 372 and 374. Steps 378 and 380 represent the communication of data between the UPF and application servers 118 which is represented by arrow 382.

In step 384 congestion is experienced in the uplink (UL) or downlink (DL) used to communicate between the UE 106 and BS 120. DL congestion feedback information is communicated in step 386 along with data packets to the application server or servers 118 via the base station and UPF along with data packets transmitted in the UL. Similarly downlink packets are received in communication step 386 at the UE along with downlink congestion feedback information. Steps 386, 388, 392, 394, 398 and 400 represent communications steps in which data packets with congestion information are received and/or transmitted at the device to which the specific step corresponds. Between base station 114 and the UPF user data is communicated as packets with the packets having an IP Header ECN filed set to CE and with the latest feedback congestion information being indicated with the transmitted packet to the destination device to which the packet is directed. Step 404 represents the receipt of uplink congestion feedback information, e.g., L4S feedback information corresponding to application 2 133 being received by the UE while step 406 represents the application server 2 121 receiving downlink congestion feedback information, e.g., APP2 L4S feedback information, sent by the UE 106 with regard to application 2 data communication.

Steps 408, 410, 414, 416, 420, 422 represent the communication of additional user data with congestion feedback information being communicated between the devices corresponding to the steps (e.g., above the numbered step represented by the numbered dot) with arrows 412, 418 and 424 representing the communication between the devices. As a result of the communication represented by the arrows 412, 418, 424 updated uplink and downlink congestion information is communicated between the various devices with the UE receiving updated uplink congestion feedback information in step 408 and the application server 121 receiving updated downlink congestion feedback information relating to application 2 in step 422.

Based on the updated uplink congestion feedback information the UE in step 426 performs uplink rate adaption, e.g., adjusts encoding and/or other transmission parameters to decrease the uplink data rate corresponding to application 2 133 in response to receiving updated uplink feedback information indicating an increase in uplink congestion or increases the uplink data rate in response to receiving updated uplink feedback information indicating a decrease in uplink congestion with regard to application 2 133.

Similarly in step 428 the application server 2 121 performs downlink rate adaption, e.g., adjusts encoding and/or other transmission parameters to decrease the downlink data rate corresponding to application 2 133 in response to receiving updated downlink feedback information indicating an increase in downlink congestion or to increase the downlink data rate in response to receiving updated downlink feedback information indicating a decrease in downlink congestion with respect to application 2 133 data transmissions.

In steps 430, 432, 434, 436, 440 and 442 the communication of application 2 data transmissions continues with the corresponding devices receiving and/or sending application 2 data along with updated congestion feedback information as represented by bi-direction arrows 434, 438, 444.

Step 446 indicates that no congestion is detected by the base station 120 in the uplink or downlink indicating that the rate adaption performed in steps 426 and 428 was successful and that no additional rate adaptation is required until a change in congestion is detected.

Figure 4:
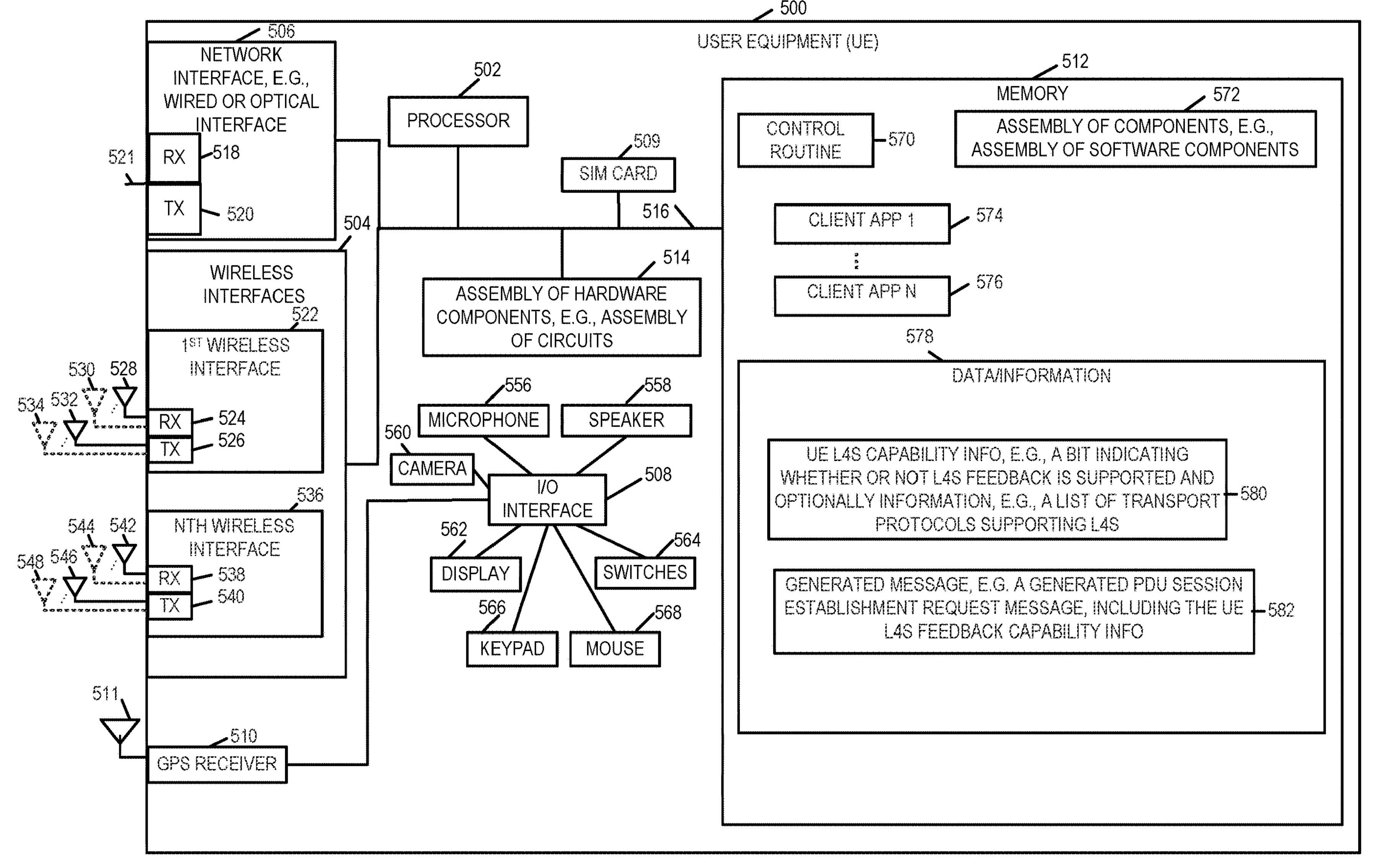
FIG. 4 is drawing of an exemplary user equipment (UE) in accordance with an exemplary embodiment.

FIG. 4 is a drawing of an exemplary user equipment (UE) 500 in accordance with an exemplary embodiment. Exemplary UE 500 is, e.g., any of the UEs (106, 108, 110, 112) of system 100 of FIG. 1. UE 500 includes processor 502, e.g., a CPU, a wireless interface 504, network interface 506, I/O interface 508, Subscriber Identity module (SIM) card 509, GPS receiver 510, memory 512 and assembly of hardware components 514, e.g., an assembly of circuits, coupled together via bus 516 over which the various elements may exchange data and information.

Wireless interfaces 504 includes a plurality of wireless interfaces (1st wireless interface 522, . . . , Nth wireless interface 536). 1st wireless interface 522 includes wireless receiver (RX) 524 and wireless transmitter (TX) 526. Wireless receiver 524 is coupled to one or more receive antennas or antenna elements (528, . . . , 530) via which the UE 500 receives wireless signals, e.g., from a radio access network node, e.g., a gNB base station. Wireless transmitter 526 is coupled to one or more transmit antennas or antenna elements (532, . . . , 534) via which the UE 500 transmits wireless signals, e.g., to a radio access network node, e.g., a gNB base station. In some embodiments, the same antennas are used for transmit and receive with regard to the 1st wireless interface 522. Nth wireless interface 536 includes wireless receiver (RX) 538 and wireless transmitter (TX) 540. Wireless receiver 538 is coupled to one or more receive antennas or antenna elements (542, . . . , 544) via which the UE 500 receives wireless signals, e.g., from a radio access network node, e.g., a gNB base station. Wireless transmitter 540 is coupled to one or more transmit antennas or antenna elements (546, . . . , 548) via which the UE 500 transmits wireless signals, e.g., to a radio access network node, e.g., a gNB base station. In some embodiments, the same antennas are used for transmit and receive with regard to the 2nd wireless interface 536. In some embodiments the 1st wireless interface 522 and the nth wireless interface 536 are used for different communications bands and/or correspond to different technologies.

Network interface 506, e.g., a wired or optical interface, includes receiver 518, transmitter 520 and connector 521. Network interface 506 allows the UE 500 to connect to a wired or optical interface, when the UE 500 is stationary and the wired or optical interface is available.

GPS receiver 510 is coupled to GPS antenna 511 via which the UE 500 receives GPS signals used to determine UE position and velocity. UE 500 further includes a plurality of I/O devices (microphone 556, speaker 558, camera 560, display 562, e.g., a touch screen display, switches 564, keypad 566, and mouse 568) coupled to I/O interface 508 via which the via I/O devices may interact with other elements within UE 500.

Memory 512 includes a control routine 570, an assembly of components 572, e.g., an assembly of software components, a plurality of client applications (client app 1 574, . . . , client app N 576), and data/information 578. Different applications may, and sometimes do, have different requirements with regard to latency, etc. For example some applications require classic SF ECT(0) and some applications require LL SF ECT(1). Data/information 578 includes UE L4S feedback capability information 580, e.g., a bit indicating whether or not the UE supports L4S feedback, and optionally additional information, e.g., a list of transport protocols supporting L4S feedback. Data/information 578 further includes a generated message 582 conveying the UE L4S feedback capability information, e.g., a generated PDU session establishments message, conveying the UE L4S feedback capability information.

Figure 5:
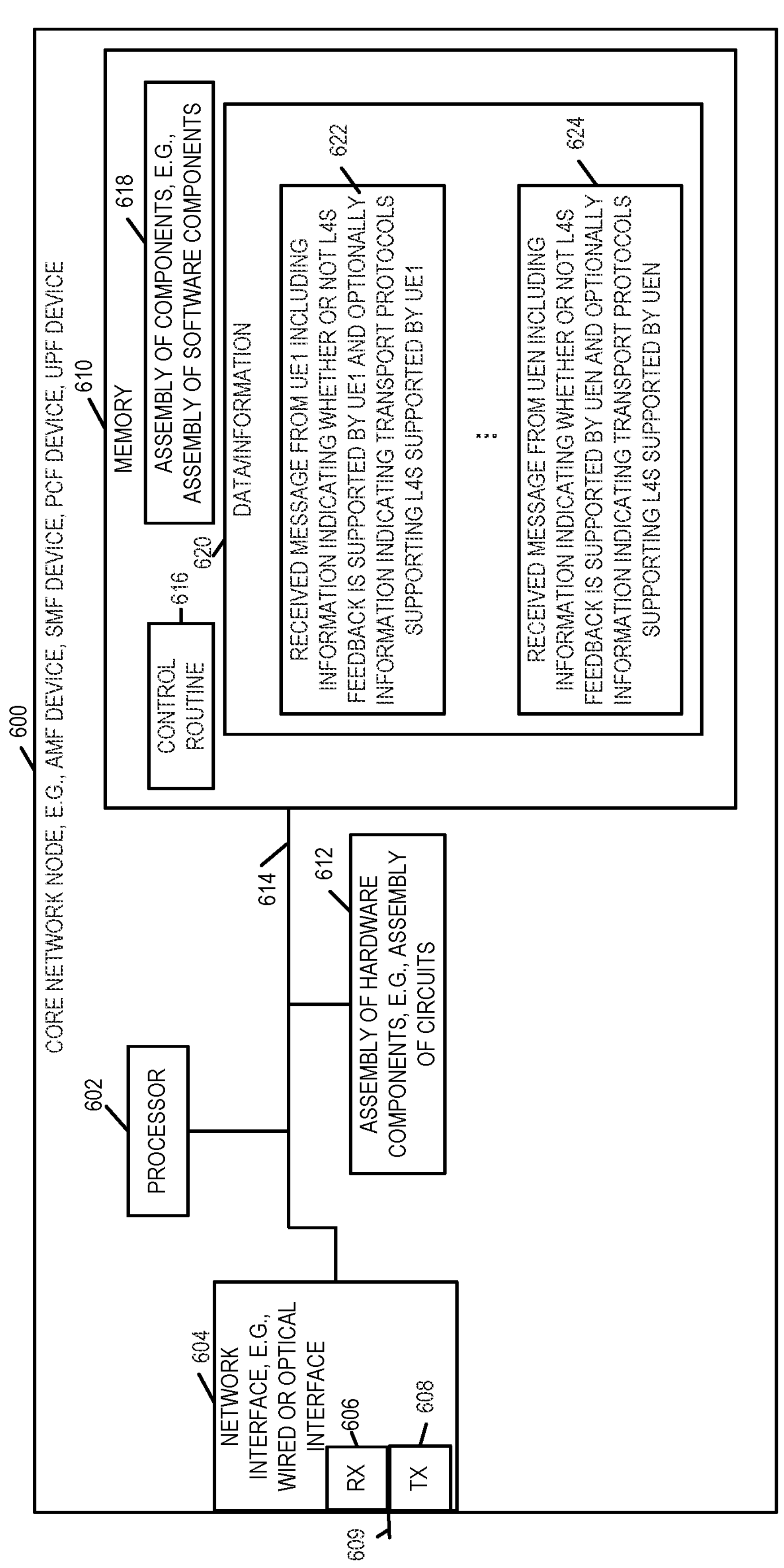
FIG. 5 is a drawing of an exemplary core network node, e.g., an AMF device, an SMF device, or a UPF device, in accordance with an exemplary embodiment.

FIG. 5 is a drawing of an exemplary core network node 600, e.g., an AMF device, an SMF device, a PCF device, or a UPF device, in accordance with an exemplary embodiment. Core network node 600 is, e.g., AMF 124, SMF 126, PCF 127, or UPF 128 of system 100 of FIG. 1 and FIG. 3. Core network node 600 includes a processor 602, e.g., a CPU, a network interface 604, e.g., a wired or optical interface, an assembly of hardware components 612, e.g., an assembly of circuits, and memory 610, coupled together via a bus 614 over which the various elements may interchange data and information.

Network interface 604, e.g., a wired or optical interface, include a receiver 606, a transmitter 608 and a connector 609. Memory 610 includes a control routine 616, an assembly of components 618, e.g., an assembly of software components, and data/information 620. Data information 620 includes a received message 622 from UE 1, said received message including information indicating whether or not L4S feedback is supported by UE1 and optionally including information indicating a list of transport protocols supporting L4S supported by UE1, and a received message 624 from UE N, said received message including information indicating whether or not L4S feedback is supported by UEN and optionally including information indicating a list of transport protocols supporting L4S supported by UEN. In some embodiments, the received message is one of: a registration request message, a registration modification message, a PDU session establishment request message or a PDU session modification request message.

Figure 6:
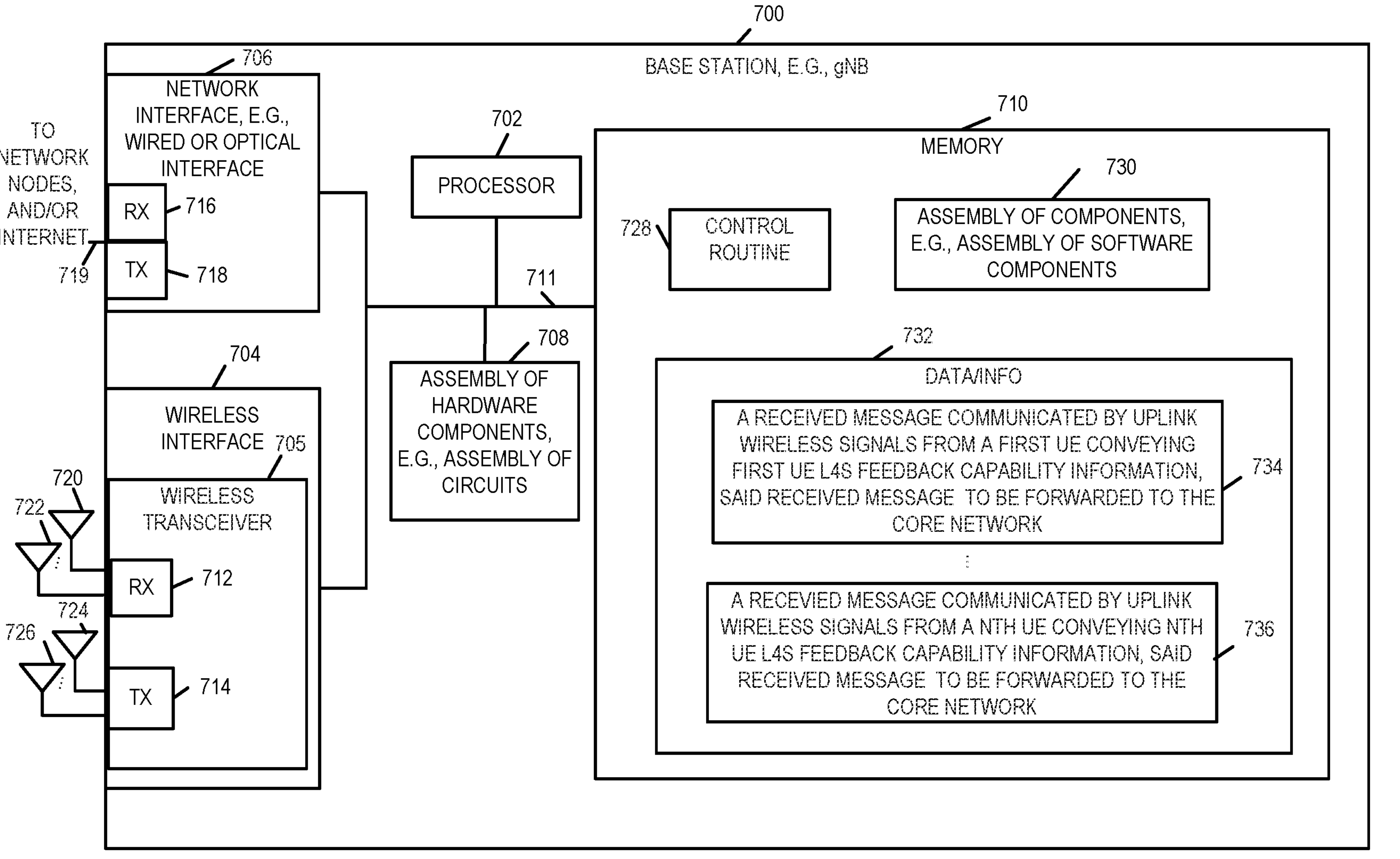
FIG. 6 is a drawing of an exemplary base station, e.g., a gNB in accordance with an exemplary embodiment.

FIG. 6 is a drawing of an exemplary base station 700, e.g., a gNB, in accordance with an exemplary embodiment. Base station 700 is, e.g., base station 120 of FIG. 1 and FIG. 3. Base station 700 includes a processor 702, e.g., a CPU, a wireless interface 704, a network interface 706, e.g., a wired or optical interface, an assembly of hardware components 708, e.g., an assembly of circuits, and memory 710 coupled together via a bus 711 over which the various elements may interchange data and information. Network interface 706, e.g., a wired or optical interface includes a receiver 716 a transmitter 718 and a connector 719. Network interface 706 coupled the base station 700 to network nodes, e.g., core network nodes including, e.g., AMF, SMF, UPFs, other base stations and/or the Internet. Wireless interface 704 includes a wireless receiver 712 coupled to one or more receive antennas or antenna elements (720, . . . , 722) via which the base station receives uplink wireless signals from UEs. Wireless interface 704 further includes a wireless transmitter 714 coupled to one or more transmit antennas or antenna elements (724, . . . , 726) via which the base station 700 transmits downlink signals to UEs. In some embodiments, the same antennas are used for transmit and receive. In some embodiments, the wireless receiver 712 and the wireless transmitter 714 are included as part of a wireless transceiver 705.

Memory 710 includes a control routine 728, an assembly of components 730, e.g., an assembly software components, and data/information 732. Data/information 730 includes a received message 732 communicated by uplink wireless signals from a first UE, said received message communicating first UE L4S feedback capability information, said received message to be forwarded to a core network, and a received message 734 communicated by uplink wireless signals from a second UE, said received message communicating second UE L4S feedback capability information, said received message to be forwarded to a core network. In some embodiments, the received message is one of: a registration request message, a registration modification message, a session establishment request message, or a session modification message.

Figure 7A:
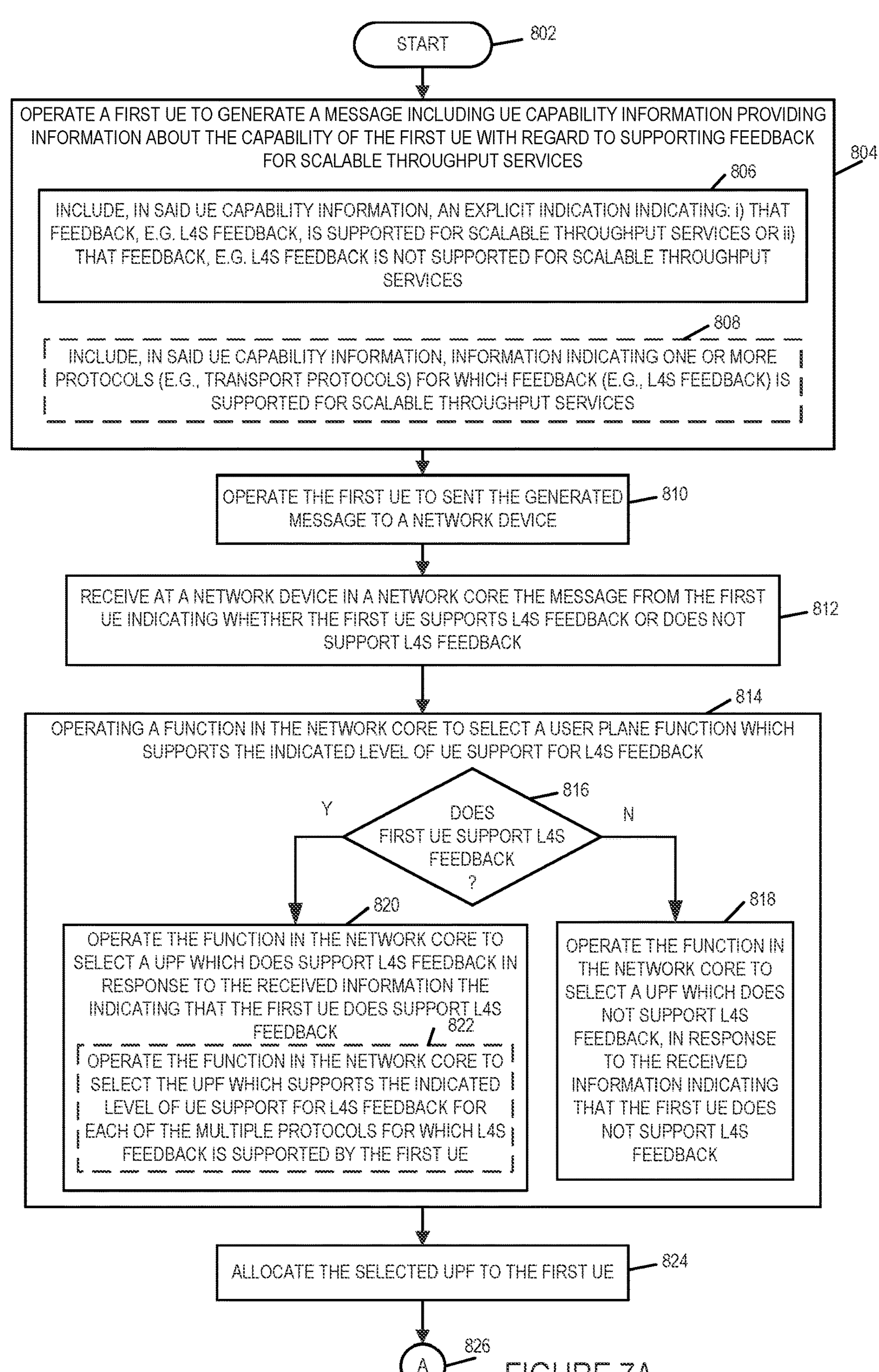
FIG. 7A is a first part of a flowchart of an exemplary communications method in accordance with an exemplary embodiment.
Figures 7, 7B:
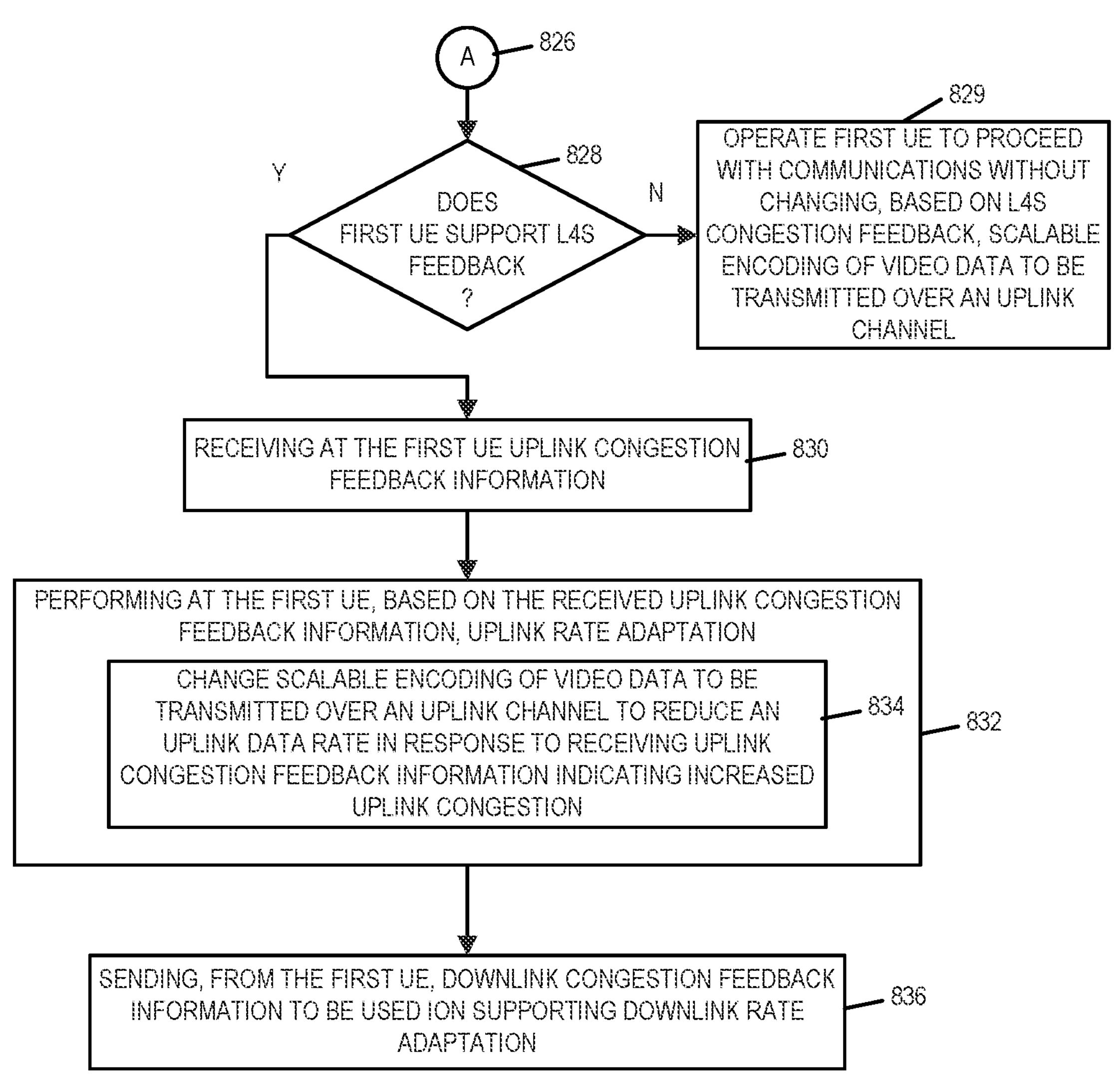
FIG. 7B is a second part of a flowchart of an exemplary communications method in accordance with an exemplary embodiment.
FIG. 7 comprises the combination of FIG. 7A and FIG. 7B.

FIG. 7, comprising the combination of FIG. 7A and FIG. 7B, is a flowchart of an exemplary communications method in accordance with an exemplary embodiment. The exemplary communications method is performed, e.g., by system 100 of FIG. 1. Operation starts in step 802 in which the communications system is powered on and initialized. Operation proceeds from start step 802 to step 804.

In step 804, a first UE, e.g., UE1A 106, is operated to generate a message including UE capability information providing information about the capability of the first UE with regard to supporting feedback (e.g., congestion feedback) for scalable throughput services (e.g., low latency, low loss and scalable throughput services (L4S services) or explicit congestion notification (ECN) services which use congestion feedback for encoding and/or data rate control. In some embodiments, the generated message is a session establishment request message, e.g., a PDU session establishment request message. In some embodiments, the generated message is a session modification request message, e.g., a PDU session modification request message. In some embodiments, the generated message is a registration request message. In some embodiments, the generated message is a registration modification message.

Step 804 includes step 806, and in some embodiments, includes step 808. In step 806 the first UE includes in said UE capability information, an explicit indication indicating: i) that feedback, e.g., L4S feedback, is supported for scalable throughput services, or ii) that feedback, e.g., L4S feedback is not supported for scalable throughput services. In some such embodiments, the UE capability information includes a one bit indicator having a first value (e.g., a value of 1) when indicating that the first UE support feedback (e.g., L4S feedback) for scalable throughput services and a second value (e.g., a value of 0) when indicating that the first UE does not support feedback (e.g., L4S feedback) for scalable throughput services. In step 808, which is included in some embodiments, the first UE includes in said UE capability information, information indicating one or more protocols, e.g., transport protocols, for which feedback, e.g., L4S feedback, is supported for scalable throughput services. In some embodiments, the message includes protocol information indicating one or more protocols (e.g., transport protocols) for which L4S feedback is supported when said explicit indicator indicates that the first UE supports L4S feedback. In various embodiments, the one or more protocols are particular transport protocols (e.g., being used by or for client applications on the first UE) which support the use of L4S feedback (e.g., from among a set (e.g., a larger set) of know protocols which support the use of L4S feedback). In some embodiments, the message includes a list of transport protocols supporting L4S feedback (e.g., the list includes one or more or all of the following: IETF specified Transport protocols: i) For TCP: draft-ietf-tcpm-accurate-ecn-22 (AccECN, More Accurate ECN Feedback in TCP), ii) For UDP: RFC 9000 (QUIC, A UDP-Based Multiplexed and Secure Transport), iii) FOR UDP: RFC 4340 (DDCP, Datagram Congestion Control Protocol), iv) For RTP: RFC 8888 (RTCP, RTP Control Protocol Feedback for Congestion Control), v) Reserved for future IETF specified transport protocols (i.e. SCTP).

In some embodiments, in which the generated message is a session establishment request message or a session modification request message, the UE capability information providing information about the capability of the first UE with regard to supporting feedback is L4S feedback capability information, and the L4S capability information is included in a 5G session management (5GSM) capability information element (IE). In some embodiments, in which the generated message is a registration request message or a registration modification message, the UE capability information providing information about the capability of the first UE with regard to supporting feedback is L4S feedback capability information, and the L4S capability information is included in a 5G mobility management (5GMM) capability information element (IE). In some embodiments, the UE capability information providing information about the capability of the first UE with regard to supporting feedback is L4S feedback capability information, and the L4S capability information is included in a new IE dedicated to conveying UE L4S feedback capability information.

Operation proceeds from step 804 to step 810. In step 810 the first UE is operated to send (e.g., transmit to a base station, e.g., gNB 120, coupled to a core network, with the destination device for the message being a core network device) the generated message to a network device (e.g., a core network device such as an AMF device 124 or an SMF 126). Operation proceeds from step 810 to step 812. In step 812 a network device in a network core receives the message from the first UE indicating whether the first UE supports L4S feedback or does not support L4S feedback. Operation proceeds from step 812 to step 814.

In step 814 a function in the network core (e.g., SMF 126) is operated to select a user plane function which supports the indicated level of UE support for L4S feedback. Step 814 includes steps 816, 818 and 820. In step 816 the if the function in the network core determines that the first UE does not support L4S feedback, then operation proceeds from step 816 to step 818, in which the function in the network core is operated to select a UPF (e.g., UPF 129) which does not support feedback, in response to the determination that the first UE indicates that is does not support L4S feedback. In step 816 the if the function in the network core determines that the first UE does support L4S feedback, then operation proceeds from step 816 to step 818, in which the function in the network core is operated to select a UPF (e.g., UPF 128 or UPF 131) which does support feedback, in response to the determination that the first UE indicates that is does support L4S feedback. In some embodiments, step 820 includes step 822 in which the function in the network core is operated to select the UPF (e.g., UPF 128) which supports the indicated level of UE support for L4S feedback for each of the multiple protocols for which L4S feedback is supported by the first UE. Operation proceeds from step 814 to step 824.

In step 824 the selected UPF is allocated, e.g., by the selecting function in the network core, to the first UE. Operation proceeds from step 824, via connecting node A 826 to step 828. In step 828 if the first UE does not support L4S feedback, then operation proceeds from step 828 to step 829, in which the first UE is operated to proceed with communications without changing, based on L4S congestion feedback, scalable encoding of video data to be transmitted over an uplink channel. However, in step 828 if the first UE does support L4S feedback, then operation proceeds from step 828 to step 830, in which the first UE is operated to receive uplink congestion feedback information. Operation proceeds from step 830 to step 832. In step 832 the first UE performs, based on the received uplink congestion feedback information, uplink rate adaptation. Step 832 includes step 834 in which the first UE changes scalable encoding of video data to be transmitted over an uplink channel to reduce an uplink data rate in response to receiving uplink congestion feedback information indicating increased uplink congestion. Operation proceeds from step 832 to step 836.

In step 836 the first UE is operated to send (e.g., to an application server (e.g., APP server 2 121) via a radio access network node (e.g., gNB base station 120) and core network including a UPF (e.g., UPF 128) downlink congestion feedback information to be used in supporting downlink rate adaptation.

Numbered List of Exemplary Method Embodiments

Method Embodiment 1. A communications method, the method comprising: operating a first user equipment (UE) to perform the steps of: generating (804) a message including UE capability information providing information about the capability of the first UE with regard to supporting feedback (e.g., congestion feedback) for scalable throughput services (e.g., low latency, low loss and scalable throughput services (L4S services) or explicit congestion notification (ECN) services which use congestion feedback for encoding and/or data rate control); and sending (810) (e.g., transmitting to a base station coupled to a core network device or communicating the message via a wired or wireless link and an access network to a core network device) said message to a network device (e.g., a core network device such as an AMF device).

Method Embodiment 1A. The method of Method Embodiment 1, wherein the message further includes an explicit request for an L4S QoS (Quality of Service) flow.

Method Embodiment 1B. The method of Method Embodiment 1A wherein said message is a Session Establishment Request message or a Session Modification Request message (e.g., a PDU Session Establishment Request message or a PDU Session Modification Request message).

Method Embodiment 2. The method of Method Embodiment 1, wherein said UE capability information includes an explicit indication: i) that feedback (e.g., L4S feedback) is supported for scalable throughput services or ii) that feedback (e.g., L4S feedback) is not supported for scalable throughput services.

Method Embodiment 3. The method of Method Embodiment 2 wherein said UE capability information includes an indicator (e.g., a 1 bit indicator) having a first value (e.g., a value of 1) when indicating that the first UE supports feedback (e.g., L4S feedback) for scalable throughput services and a second value (e.g., value of 0) when indicating that the first UE does not support feedback (e.g., L4S feedback) for scalable throughput services.

Method Embodiment 4. The method of Method Embodiment 1, wherein said UE capability information indicates protocol information indicating one or more protocols for which feedback (e.g., L4S feedback) for scalable throughput services is supported.

Method Embodiment 5. The method of Method Embodiment 4, wherein said protocol information indicates that feedback (e.g., L4S feedback) for scalable throughput services is supported by the UE for one or more of: i) TCP (Transmission Control Protocol) (e.g., where the feedback (e.g., L4S feedback) and its used may be, and sometimes is, such as that described in draft-ietf-tcpm-accurate-ecn-22 (AccECN, More Accurate ECN Feedback in TCP)); ii) UDP (e.g., where the feedback (e.g., L4S feedback) and its use may be, and sometimes is, such as that described in RFC 9000 (QUIC, A UDP-Based Multiplexed and Secure Transport); iii) for UDP (e.g., where the feedback (e.g., L4S feedback) and its use may be, and sometimes is, such as that described in RFC 9000 (QUIC, A UDP-Based Multiplexed and Secure Transport); iv) DCCP (Datagram Congestion Control Protocol) (e.g., where the feedback (e.g., L4S feedback) and its use may be, and sometimes is, such as that described in RFC 4340 (DCCP, Datagram Congestion Control Protocol); v) RTCP (e.g., where the feedback (e.g., L4S feedback) and its use may be, and sometimes is such, as that described in RFC 8888 (RTCP, RTP Control Protocol Feedback for Congestion Control); or vi) an IETF specified transport protocol identified in the message which supports feedback. (e.g., SCTP).

Method Embodiment 6. The method of Method Embodiment 1, wherein said message includes an explicit indicator (e.g., a one bit indicator) indicating whether the UE supports L4S feedback or does not support L4S feedback.

Method Embodiment 7. The method of Method Embodiment 6, wherein said message includes protocol information indicating one or more protocols (e.g., transport protocols) for which L4S feedback is supported when said explicit indicator indicates that the first UE supports L4S feedback.

Method Embodiment 8. The method of Method Embodiment 7, wherein said one or more protocols are transport protocols that support the use of L4S feedback.

Method Embodiment 9. The method of Method Embodiment 7, where said message includes a list of transport protocols supporting L4S feedback (e.g., the list includes one or more or all of the following IETF RFCs or drafts specified Transport protocols): a) For TCP: draft-ietf-tcpm-accurate-ecn-22 (AccECN, More Accurate ECN Feedback in TCP), b) For UDP: RFC 9000 (QUIC, A UDP-Based Multiplexed and Secure Transport), c) For UDP: RFC 4340 (DCCP, Datagram Congestion Control Protocol), d) For RTP: RFC 8888 (RTCP, RTP Control Protocol Feedback for Congestion Control) e) Reserved for future IETF specified transport protocols (i.e., SCTP).

Method Embodiment 10. The method of Method Embodiment 1, wherein said message is a session establishment request message (e.g., a PDU Session Establishment Request message).

Method Embodiment 11. The method of Method Embodiment 1, wherein said message is a session modification request message (e.g., a PDU Session Modification Request message).

Method Embodiment 12. The method of Method Embodiment 1, wherein said message is a registration request message (e.g., Registration Request message, where Registration Type is Initial Registration).

Method Embodiment 13. The method of Method Embodiment 1, wherein said message is a registration update message (e.g. Registration Request message, where Registration Type is Mobility Registration Update).

Method Embodiment 14. The method of Method Embodiment 1, wherein said UE capability information providing information about the capability of the first UE with regard to supporting feedback is L4S feedback capability information, and wherein said L4S feedback capability is included in a 5G Session Management (5GSM) capability information element.

Method Embodiment 15. The method of Method Embodiment 1, wherein said UE capability information providing information about the capability of the first UE with regard to supporting feedback is L4S feedback capability information, and wherein said L4S feedback capability information is included in a 5G Mobility Management (5GMM) capability information element.

Method Embodiment 16. The method of Method Embodiment 1, wherein said UE capability information providing information about the capability of the first UE with regard to supporting feedback is L4S feedback capability information, and wherein said L4S feedback capability information is included in an IE dedicated to conveying UE L4S feedback capability information.

Method Embodiment 17. The method of Method Embodiment 2, further comprising: receiving (830) at the first UE uplink congestion feedback information; and performing (832) at the first UE, based on the received uplink congestion feedback information, uplink rate adaptation.

Method Embodiment 18. The method of Method Embodiment 17, wherein said uplink rate adaptation includes changing (834) scalable encoding of video data to be transmitted over an uplink channel to reduce an uplink data rate in response to receiving uplink congestion feedback information indicating increased uplink congestion.

Method Embodiment 19. The method of Method Embodiment 17, further comprising: sending (836) (e.g., to an application server via a radio access network (gNB base station) and core network including a UPF), from the first UE, downlink congestion feedback information to be used in supporting downlink rate adaptation.

Method Embodiment 20. The method of Method Embodiment 6, further comprising: receiving (812) at a network device in a network core (e.g., a core network device such as the AMF or SMF) the message from the first UE indicating whether the UE supports L4S feedback or does not support L4S feedback; and operating (814) a function in the network core to select a user plane function (UPF) which supports the indicated level of UE support for L4S Service; and allocating (824) the selected UPF to the first UE.

Method Embodiment 21. The method of Method Embodiment 20, wherein the selecting (814) selects (820) a UPF function which does support L4S feedback when the first UE indicates that it does support L4S feedback; and wherein the selecting (814) selects (818) a UPF function which does not support L4S feedback when the first UE indicates that it does not support L4S feedback.

Method Embodiment 22. The method of Method Embodiment 20, wherein said message from the first UE includes protocol information indicating multiple protocols (e.g., transport protocols) for which L4S feedback is supported; and wherein operating (814) the function in the network core to select the user plane function (UPF) which supports the indicated level of UE support for L4S feedback includes selecting (822) a UPF function which supports L4S Services for each of the multiple protocols for which L4S feedback is supported by the first UE.

Method Embodiment 23. A communications method, the method comprising: operating a first user equipment (UE) to perform the steps of: generating (804) a message including an explicit request for an L4S QoS (Quality of Service) flow; and sending (810) (e.g., transmitting to a base station coupled to a core network device or communicating the message via a wired or wireless link and an access network to a core network device) said message to a network device (e.g., a core network device such as an AMF device).

Method Embodiment 24. The method of Method Embodiment 23, wherein said message is a Session Establishment Request message or a Session Modification Request message (e.g., a PDU Session Establishment Request message or a PDU Session Modification Request message).

Method Embodiment 25. The method of Method Embodiment 1, wherein said message is a registration message that provides UE L4S Feedback capability information to an SMF and Policy Control Function (PCF) in the communications network core to support PDU Session Establishment and/or PDU session Modification operations.

Method Embodiment 26. The method of Method Embodiment 1, wherein said message is a registration update message (e.g. Registration Request message, where Registration Type is Mobility Registration Update).

Method Embodiment 27. The method of Method Embodiment 1, wherein said message is a registration update message; and wherein the network core receiving the registration update message selects an SMF supporting L4S Services based on the information in the received registration.

Method Embodiment 28. The method of Method Embodiment 1, wherein said message is a registration update message that can provides UE L4S Feedback capability information to an SMF and PCF during PDU Session Establishment or Modification procedure.

Numbered List of Exemplary Apparatus Embodiments

Apparatus Embodiment 1. A first user equipment (UE) comprising: memory storing UE capability information (e.g., L4S feedback support capability information) indicating the capability of the first UE to support feedback for scalable throughput services; and a processor configured to control the first UE to: generate (804) a message including UE capability information providing information about the capability of the first UE with regard to supporting feedback (e.g., congestion feedback) for scalable throughput services (e.g., low latency, low loss and scalable throughput services (L4S services) or explicit congestion notification (ECN) services which use congestion feedback for encoding and/or data rate control); and send (810) (e.g., transmit to a base station coupled to a core network device or communicate the message via a wired or wireless link and an access network to a core network device) said message to a network device (e.g., a core network device such as an AMF device).

Apparatus Embodiment 1A. The first UE of Apparatus Embodiment 1, wherein the message further includes an explicit request for an L4S QoS (Quality of Service) flow.

Apparatus Embodiment 1B. The first UE of Apparatus Embodiment 1A wherein said message is a Session Establishment Request message or a Session Modification Request message (e.g., a PDU Session Establishment Request message or a PDU Session Modification Request message).

Apparatus Embodiment 2. The first UE of Apparatus Embodiment 1, wherein said UE capability information includes an explicit indication: i) that feedback (e.g., L4S feedback) is supported for scalable throughput services or ii) that feedback (e.g., L4S feedback) is not supported for scalable throughput services.

Apparatus Embodiment 3. The first UE of Apparatus Embodiment 2 wherein said UE capability information includes an indicator (e.g., a 1 bit indicator) having a first value (e.g., a value of 1) when indicating that the first UE supports feedback (e.g., L4S feedback) for scalable throughput services and a second value (e.g., value of 0) when indicating that the first UE does not support feedback (e.g., L4S feedback) for scalable throughput services.

Apparatus Embodiment 4. The first UE of Apparatus Embodiment 1, wherein said UE capability information indicates protocol information indicating one or more protocols for which feedback (e.g., L4S feedback) for scalable throughput services is supported.

Apparatus Embodiment 5. The first UE of Apparatus Embodiment 4, wherein said protocol information indicates that feedback (e.g., L4S feedback) for scalable throughput services is supported by the UE for one or more of: i) TCP (Transmission Control Protocol) (e.g., where the feedback (e.g., L4S feedback) and its used may be, and sometimes is, such as that described in draft-ietf-tcpm-accurate-ecn-22 (AccECN, More Accurate ECN Feedback in TCP)); ii) UDP (e.g., where the feedback (e.g., L4S feedback) and its use may be, and sometimes is, such as that described in RFC 9000 (QUIC, A UDP-Based Multiplexed and Secure Transport); iii) for UDP (e.g., where the feedback (e.g., L4S feedback) and its use may be, and sometimes is, such as that described in RFC 9000 (QUIC, A UDP-Based Multiplexed and Secure Transport); iv) DCCP (Datagram Congestion Control Protocol) (e.g., where the feedback (e.g., L4S feedback) and its use may be, and sometimes is, such as that described in RFC 4340 (DCCP, Datagram Congestion Control Protocol); v) RTCP (e.g., where the feedback (e.g., L4S feedback) and its use may be, and sometimes is such, as that described in RFC 8888 (RTCP, RTP Control Protocol Feedback for Congestion Control); or vi) an IETF specified transport protocol identified in the message which supports feedback. (e.g., SCTP).

Apparatus Embodiment 6. The first UE of Apparatus Embodiment 1, wherein said message includes an explicit indicator (e.g., a one bit indicator) indicating whether the UE supports L4S feedback or does not support L4S feedback.

Apparatus Embodiment 7. The first UE of Apparatus Embodiment 6, wherein said message includes protocol information indicating one or more protocols (e.g., transport protocols) for which L4S feedback is supported when said explicit indicator indicates that the first UE supports L4S feedback.

Apparatus Embodiment 8. The first UE of Apparatus Embodiment 7, wherein said one or more protocols are transport protocols that support the use of L4S feedback.

Apparatus Embodiment 9. The first UE of Apparatus Embodiment 7, where said message includes a list of transport protocols supporting L4S feedback (e.g., the list includes one or more or all of the following IETF RFCs or drafts specified Transport protocols): a) For TCP: draft-ietf-tcpm-accurate-ecn-22 (AccECN, More Accurate ECN Feedback in TCP), b) For UDP: RFC 9000 (QUIC, A UDP-Based Multiplexed and Secure Transport), c) For UDP: RFC 4340 (DCCP, Datagram Congestion Control Protocol), d) For RTP: RFC 8888 (RTCP, RTP Control Protocol Feedback for Congestion Control), e) Reserved for future IETF specified transport protocols (i.e., SCTP).

Apparatus Embodiment 10. The first UE of Apparatus Embodiment 1, wherein said message is a session establishment request message (e.g., a PDU Session Establishment Request message).

Apparatus Embodiment 11. The first UE of Apparatus Embodiment 1, wherein said message is a session modification request message (e.g., a PDU Session Modification Request message).

Apparatus Embodiment 12. The first UE of Apparatus Embodiment 1, wherein said message is a registration request message (e.g., Registration Request message, where Registration Type is Initial Registration).

Apparatus Embodiment 13. The first UE of Apparatus Embodiment 1, wherein said message is a registration update message (e.g. Registration Request message, where Registration Type is Mobility Registration Update).

Apparatus Embodiment 14. The first UE of Apparatus Embodiment 1, wherein said UE capability information providing information about the capability of the first UE with regard to supporting feedback is L4S feedback capability information, and wherein said L4S feedback capability is included in a 5G Session Management (5GSM) capability information element.

Apparatus Embodiment 15. The first UE of Apparatus Embodiment 1, wherein said UE capability information providing information about the capability of the first UE with regard to supporting feedback is L4S feedback capability information, and wherein said L4S feedback capability information is included in a 5G Mobility Management (5GMM) capability information element.

Apparatus Embodiment 16. The first UE of Apparatus Embodiment 1, wherein said UE capability information providing information about the capability of the first UE with regard to supporting feedback is L4S feedback capability information, and wherein said L4S feedback capability information is included in an IE dedicated to conveying UE L4S feedback capability information.

Apparatus Embodiment 17. The first UE of Apparatus Embodiment 2, wherein the processor is further configured to control the first UE to: receive uplink congestion feedback information; and perform (832) at the first UE, based on the received uplink congestion feedback information, uplink rate adaptation.

Apparatus Embodiment 18. The first UE of Apparatus Embodiment 17, wherein said uplink rate adaptation includes changing (834) scalable encoding of video data to be transmitted over an uplink channel to reduce an uplink data rate in response to receiving uplink congestion feedback information indicating increased uplink congestion.

Apparatus Embodiment 19. The first UE of Apparatus Embodiment 17, wherein the processor is further configured to control the first UE to: send (836) (e.g., to an application server via a radio access network (gNB base station) and core network including a UPF), from the first UE, downlink congestion feedback information to be used in supporting downlink rate adaptation.

Apparatus Embodiment 20. A first user equipment (UE) comprising: memory storing UE information; and a processor configured to control the first UE to perform the steps of: generating (804) a message including an explicit request for an L4S QoS (Quality of Service) flow; and sending (810) (e.g., transmitting to a base station coupled to a core network device or communicating the message via a wired or wireless link and an access network to a core network device) said message to a network device (e.g., a core network device such as an AMF device).

Apparatus Embodiment 21. The first UE of Apparatus Embodiment 20, wherein said message is a Session Establishment Request message or a Session Modification Request message (e.g., a PDU Session Establishment Request message or a PDU Session Modification Request message).

Apparatus Embodiment 22. The first UE of Apparatus Embodiment 1, wherein said message is a registration message that provides UE L4S Feedback capability information to an SMF and Policy Control Function (PCF) in the communications network core to support PDU Session Establishment and/or PDU session Modification operations.

Apparatus Embodiment 23. The first UE of Apparatus Embodiment 1, wherein said message is a registration update message (e.g. Registration Request message, where Registration Type is Mobility Registration Update).

Apparatus Embodiment 24. The first UE of Apparatus Embodiment 1, wherein said message is a registration update message; and wherein the network core receiving the registration update message selects an SMF supporting L4S Services based on the information in the received registration.

Apparatus Embodiment 25. The first UE of Apparatus Embodiment 1, wherein said message is a registration update message that can provides UE L4S Feedback capability information to an SMF and PCF during PDU Session Establishment or Modification procedure.

Numbered List of Exemplary Non-Transitory Computer Readable Embodiments

Non-Transitory Computer Readable Medium Embodiment 1. A non-transitory computer readable medium including machine executable instructions which when executed by a processor of a first user equipment (UE) control the first UE to perform the steps of: generating (804) a message including UE capability information providing information about the capability of the first UE with regard to supporting feedback (e.g., congestion feedback) for scalable throughput services (e.g., low latency, low loss and scalable throughput services (L4S services) or explicit congestion notification (ECN) services which use congestion feedback for encoding and/or data rate control); and sending (810) (e.g., transmitting to a base station coupled to a core network device or communicating the message via a wired or wireless link and an access network to a core network device) said message to a network device (e.g., a core network device such as an AMF device).

Non-Transitory Computer Readable Medium Embodiment 2. A non-transitory computer readable medium including machine executable instructions which when executed by a processor of a first user equipment (UE) control the first UE to perform the steps of: generating (804) a message including an explicit request for an L4S QoS (Quality of Service) flow; and sending (810) (e.g., transmitting to a base station coupled to a core network device or communicating the message via a wired or wireless link and an access network to a core network device) said message to a network device (e.g., a core network device such as an AMF device).

The techniques of various embodiments may be implemented using software, hardware and/or a combination of software and hardware. Various embodiments are directed to apparatus, e.g., user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements. Various embodiments are also directed to methods, e.g., method of controlling and/or operating user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of each of the described methods.

In various embodiments each of the steps or elements of a method are implemented using one or more processors. In some embodiments, each of elements or steps are implemented using hardware circuitry.

In various embodiments devices, e.g., user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements described herein are implemented using one or more components to perform the steps corresponding to one or more methods, for example, provisioning user equipment devices, provisioning AP devices, provisioning AAA servers, provisioning orchestration servers, generating messages, message reception, message transmission, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements, are configured to perform the steps of the methods described as being performed by the user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements, with a processor which includes a component corresponding to each of the steps of the various described methods performed by the device in which the processor is included. In some but not all embodiments a device, e.g., user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a device, e.g., user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a user equipment device, wireless device, mobile device, smartphone, subscriber device, desktop computer, printer, IPTV, laptop, tablets, network edge device, Access Point, wireless router, switch, WLAN controller, orchestration server, orchestrator, Gateway, AAA server, server, node and/or element or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
operating a first user equipment (UE) to perform the steps of:
generating a message including UE capability information providing information about the capability of the first UE with regard to supporting feedback for scalable throughput services, wherein said UE capability information indicates protocol information indicating one or more protocols for which feedback for scalable throughput services is supported; and
sending said message to a network device.

2. The method of claim 1, wherein the message further includes an explicit request for an L4S (Low Latency, Low Loss, and Scalable Throughput) QoS (Quality of Service) flow.

3. The method of claim 2, wherein said message is a Session Establishment Request message or a Session Modification Request message.

4. The method of claim 1, wherein said UE capability information includes an explicit indication that feedback is supported for scalable throughput services.

5. The method of claim 4, wherein said UE capability information includes an indicator having a first value when indicating that the first UE supports feedback for scalable throughput services and a second value when indicating that the first UE does not support feedback for scalable throughput services, said indicator having the first value.

6. The method of claim 1, wherein said protocol information indicates that feedback for scalable throughput services is supported by the first UE for one or more of: i) TCP (Transmission Control Protocol); ii) UDP (User Datagram Protocol); iii) DCCP (Datagram Congestion Control Protocol); iv) RTCP (Real-Time Transport Control Protocol); or v) an IETF (Internet Engineering Task Force) specified transport protocol identified in the message which supports feedback.

7. The method of claim 1, wherein said message includes an explicit indicator indicating whether the first UE supports L4S (Low Latency, Low Loss, and Scalable Throughput) feedback or does not support L4S feedback, and wherein said explicit indicator indicating whether the first UE supports L4S feedback or does not support L4S feedback indicates that the first UE supports L4S feedback.

8. The method of claim 7, wherein said message includes protocol information indicating one or more protocols for which L4S feedback is supported.

9. The method of claim 8, wherein said one or more protocols are transport protocols that support the use of L4S feedback.

10. The method of claim 1, wherein said message is a registration request message.

11. The method of claim 1, wherein said message is a registration update message.

12. The method of claim 4, further comprising:

receiving at the first UE uplink congestion feedback information; and performing at the first UE, based on the received uplink congestion feedback information, uplink rate adaptation.

13. The method of claim 7, further comprising:

receiving at a network device in a network core the message from the first UE indicating whether the first UE supports L4S feedback or does not support L4S feedback, said received message from the first UE indicating that the first UE supports L4S feedback; and operating a function in the network core to select a user plane function (UPF) which supports the indicated level of first UE support for L4S Service; and allocating the selected UPF to the first UE.

14. The method of claim 13, wherein the selecting selects a UPF function which does support L4S feedback; and and wherein said message from the first UE includes protocol information indicating multiple protocols for which L4S feedback is supported; and wherein operating the function in the network core to select the user plane function (UPF) which supports the indicated level of first UE support for L4S feedback includes selecting a UPF function which supports L4S Services for each of the multiple protocols for which L4S feedback is supported by the first UE.

15. A first user equipment (UE) comprising:

memory storing UE capability information indicating the capability of the first UE to support feedback for scalable throughput services; and a processor configured to control the first UE to:

generate a message including UE capability information providing information about the capability of the first UE with regard to supporting feedback for scalable throughput services, wherein said UE capability information indicates protocol information indicating one or more protocols for which feedback for scalable throughput services is supported; and send said message to a network device.

16. The first UE of claim 15, wherein the message further includes an explicit request for an L4S (Low Latency, Low Loss, and Scalable Throughput) QoS (Quality of Service) flow.

* * * * *